United States Patent [19]

Rauch et al.

[11] 4,185,495
[45] Jan. 29, 1980

[54] BRAKE TESTING APPARATUS

[76] Inventors: Winfried Rauch, 76⅓; Josef Schilling, 30½, both of 8961 Haldenwang, Fed. Rep. of Germany

[21] Appl. No.: 924,396

[22] Filed: Jul. 13, 1978

[30] Foreign Application Priority Data

Jul. 26, 1977 [DE] Fed. Rep. of Germany ....... 2733639

[51] Int. Cl.² .............................................. G01L 5/28
[52] U.S. Cl. .................................................... 73/126
[58] Field of Search ...................... 73/126, 123, 133 R, 73/136 C, 136 R

[56] References Cited

U.S. PATENT DOCUMENTS 2,845,795  8/1958  Emmerling ........................ 73/136 R
3,995,475  12/1976  Cline ...................................... 73/126

Primary Examiner—Jerry W. Myracle
Attorney, Agent, or Firm—Holman & Stern

[57] ABSTRACT

A brake testing apparatus comprises at least one pair of motor-driven rollers on which a wheel having a brake to be tested is mounted. A leaf spring is attached at one end to the motor stator and its free end is held between opposed abutments so that when the wheel is braked, a reverse torque in the stator induces a stress in the leaf spring. Strain gauges are provided on opposite surfaces of the spring to sense the induced stress, the strain gauges being formed as a Wheatstone bridge arrangement connected in an electric circuit which measures the induced stress as a function of the bridge imbalance.

12 Claims, 9 Drawing Figures

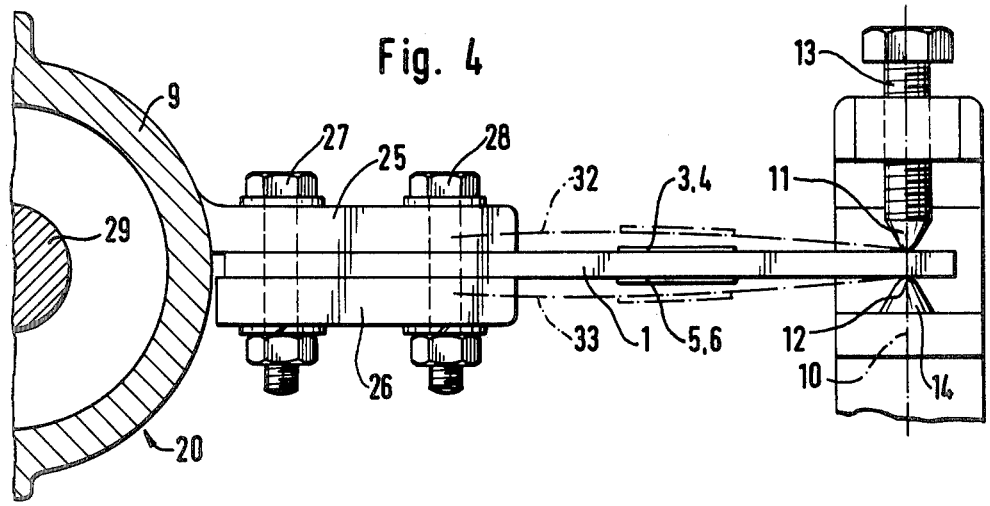
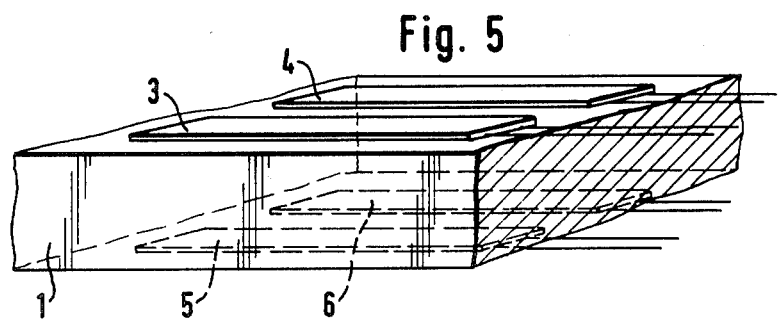
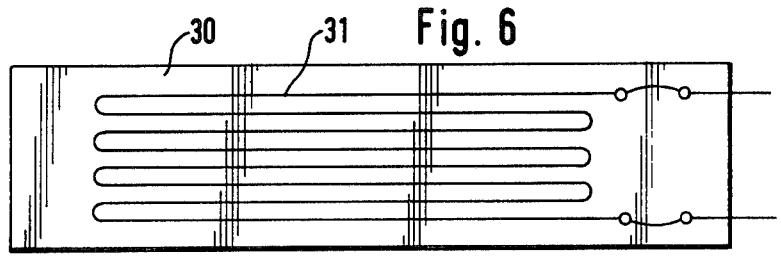

BRAKE TESTING APPARATUS

BACKGROUND OF THE INVENTION

The present invention relates to a brake-testing stand for motor vehicles comprising driven friction rollers arranged in pairs and positioned in a frame, wherein the wheel of a vehicle to be tested rolls on said friction rollers and the stator of a drive motor of the friction rollers is rotatably mounted in the frame and attached to a lever arm so that a reverse torque induced in the stator on application of a brake being tested is transmitted to the lever arm and hence to a torque-measuring or -indicating device.

Brake testing stands of the above type are known. The lever arm which is generally fixed to the stator and influences a capsule-type dynanometer (pressure cell), the corresponding measured pressure being indicated by means of a manometer. The indicating scale or the like is calibrated to indicate the measured torque value.

In general, known arrangements have two pairs of friction rollers with associated drive motors positioned adjacent to each other so that the two wheels of a motor vehicle axle can be tested simultaneously.

In the prior art arrangements, a comparatively high measuring hysteresis develops due to the fact that between the cylinder and piston of the pressure cell, friction cannot be completely eliminated and there results a difference between the dynamic and static friction. The forces for moving the piston in the cylinder from rest, due to the necessity of overcoming static friction is larger than when the piston is already in motion. The measured result with such devices is therefore not precise and is influenced by a multitude of factors which are difficult or even impossible to eliminate.

A further difficulty with the prior art brake testing stands using pressure cells results from the fact that the torque can only be measured in one direction of rotation. Even if the drive motor can be simply switched over, the dynanometer with associated devices cannot be utilized for the other rotational direction since the hydraulic arrangement is not in the position to transmit pulling forces.

BRIEF SUMMARY OF THE INVENTION

It is an object of the present invention to provide a brake testing stand of the above-described type with which it is possible to measure precise and reproducable values and in which measuring hysteresis either does not develop or will be acceptably small.

It is a further object of the invention to retain the total expenditure for the brake testing stand comparatively small and additionally also to reduce the operational costs or maintenance costs.

It is a still further object of the invention to provide an arrangement which can measure the torque in both rotational directions in a simple manner.

The invention provides a brake testing stand of the above-described type in which the lever arm is formed as a leaf spring associated at one end with the motor stator and at the other end with mounting means on the frame. The spring carries on its upper and lower surfaces resilient strain gauges which are arranged as a Wheatstone bridge, connected in circuit with an indicating means so that on application of a brake being tested, reverse torque induced in the stator is transmitted to the spring and is measured as a function of the bridge imbalance.

By means of the strain gauges which are known per se, it is possible to measure electrically small stress variations. If the strain gauges are arranged on the lower and upper surfaces of the leaf spring, which forms the torque arm, then the strain gauges measure the deformation of the torque arm and thereby the bending momentum on the measuring point. This bending momentum is proportional to the torque to be measured, so that it becomes possible to measure the torque by means of comparatively simple electrical circuitry and an electrical indicating instrument.

Test results have shown that in a brake testing stand in accordance with the invention, substantially little measuring hysteresis develops, at least not to a degree which would affect the measured result. The mechanical elements, namely, the leaf spring and associated devices, operate practically free of friction and also in the electrical or electronic area there exist no elements which would produce imprecise measuring results.

The inventive concept can be realized with a comparatively small expenditure. Since between the resilient strain gauges and the indicator device there are no moveable parts, the device can be practically maintenance-free.

Further, measurement of torque in both directions does not present practical difficulties. Depending on the formation of the leaf spring, the Wheatstone bridge produces a positive or a negative bridge imbalance, each of which is equally-well transmittable.

In a preferred embodiment of the present invention, the upper and lower surfaces of the leaf spring each carry two resilient strain gauges of the Wheatstone bridge. By utilizing a total of four resilient strain gauges, it is possible on one hand substantially to eliminate temperature influences and on the other hand there results a multiplication of the resistance changes, which develop in the resilient strain gauges themselves.

The smallest deformations of the leaf spring will suffice to obtain measurable stresses. Small deformations of the spring have the advantage that there develop no nominal displacements relative to the spring abutments, namely, substantially no frictional forces develop which could adversely influence the measuring result.

Preferably, the leaf spring is fixedly connected to the stator at one end and is provided at its other end with a supporting point on the frame. A reverse arrangement, with the spring being fixed on the frame, is also possible however although the preferred arrangement provides a simpler construction.

The utilization of a finished and hardened leaf spring is a further means for producing a high precision of measurement.

It is further preferred to use generally conical members with rounded ends as the abutments for the opposite surfaces of the spring, since these will not noticably influence the measuring result. It is of advantage if at the supporting point for the spring, it is positioned between a set screw and a block each terminating in said rounded conical members.

Eventhough it is possible with the instant invention to transmit and indicate a positive or a negative bridge imbalance, it is possible to produce in many cases advantages if, as further proposed, the increased bridge stress is rectified which can be accomplished by means of a known electrical switch. In this manner, it is possible to read off the brake torque by means of a simple indicator instrument without any further switching or any other operation.

In a different structure, it may be advantageous if the indicator instrument is provided with a center zero position, whereby the positive or negative brake torque is visible or is registered.

In a further development of the invention, the indicator device can be provided with a test data storage device which allows the storage of a predetermined value or the entire maximum value. This structure can, for example, make the reading process easier. In a brake test, it is important to establish the absolute value of the brake torque which is produced by the brake of the wheel. On the other hand, it is also important that the two brakes of a wheel axle function in general in a substantially identical manner. In order to improve the testing possibilities, the instant invention further proposes that the torque indicator device comprises two sets of testing rollers for the respective wheels of an axle, which devices are coupled to each other in such a manner so that the relationship of the measured torques or bridge stresses are compared and a signal is released when a predetermined difference is exceeded. If this difference exceeds the predetermined value, a signal is being released which indicates that the brake torques of the respective wheels differ to an impermissible degree.

In another variation of the instant invention, the measured torque value can be compared with a predetermined torque value and a signal released when there is insufficient conformity with the measured values.

The invention further proposes a storage device for predetermined torque values and/or differences of two torque values, as well as a device for the input of one or a multitude of stored values into the torque indicator device. This makes it possible extensively to simplify the measuring process and to eliminate error sources. Storage devices may, for example, contain predetermined standard brake torque values for a large number of different motor vehicles, as well as values which will indicate the permissible difference of two brakes of the same axle with reference to the respective type of motor vehicle. By means of a code, these values can be called up and an input of the same made into the torque indicator device. If the measured values do not sufficiently comply with the predetermined values, then a signal will indicate that the tested brakes are faulty.

DESCRIPTION OF DRAWINGS

FIG. 4 is an enlarged side view, partly in section, of the brake testing stand;

FIG. 5 is a prespective view of a part of a leaf spring and associated strain gauges;

FIG. 6 is a schematic view of a resilient strain gauge;

DESCRIPTION OF PREFERRED EMBODIMENT

Figure 1:
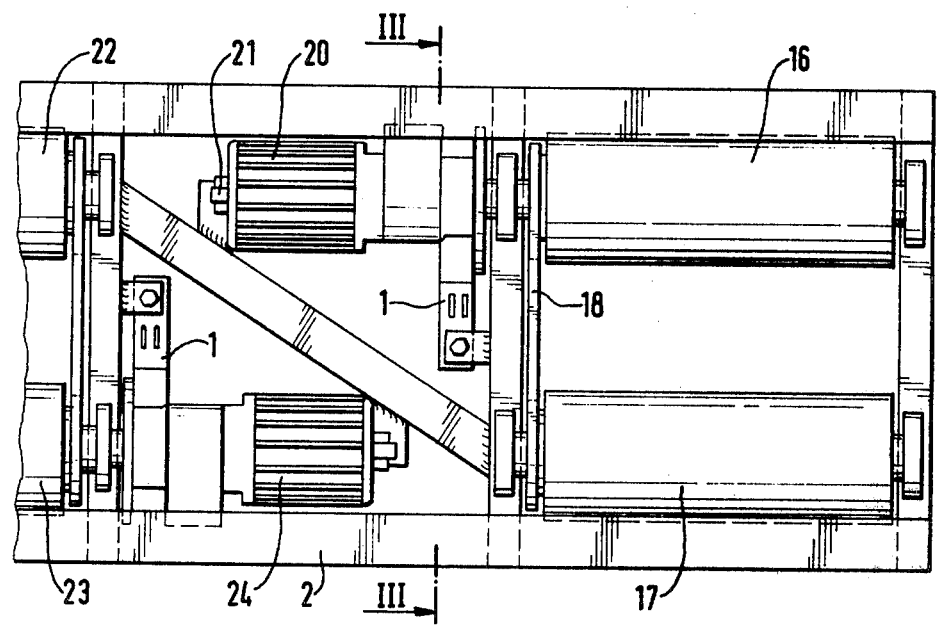
FIG. 1 is a plan view of a part of a brake testing stand.
Figure 2:
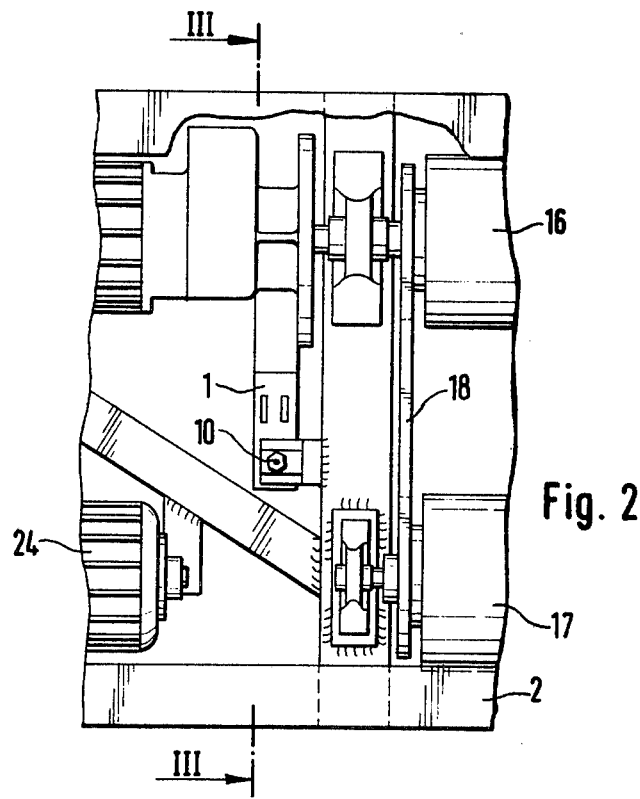
FIG. 2 is an enlarged plan view showing details of the stand illustrated in FIG. 1.
Figure 3:
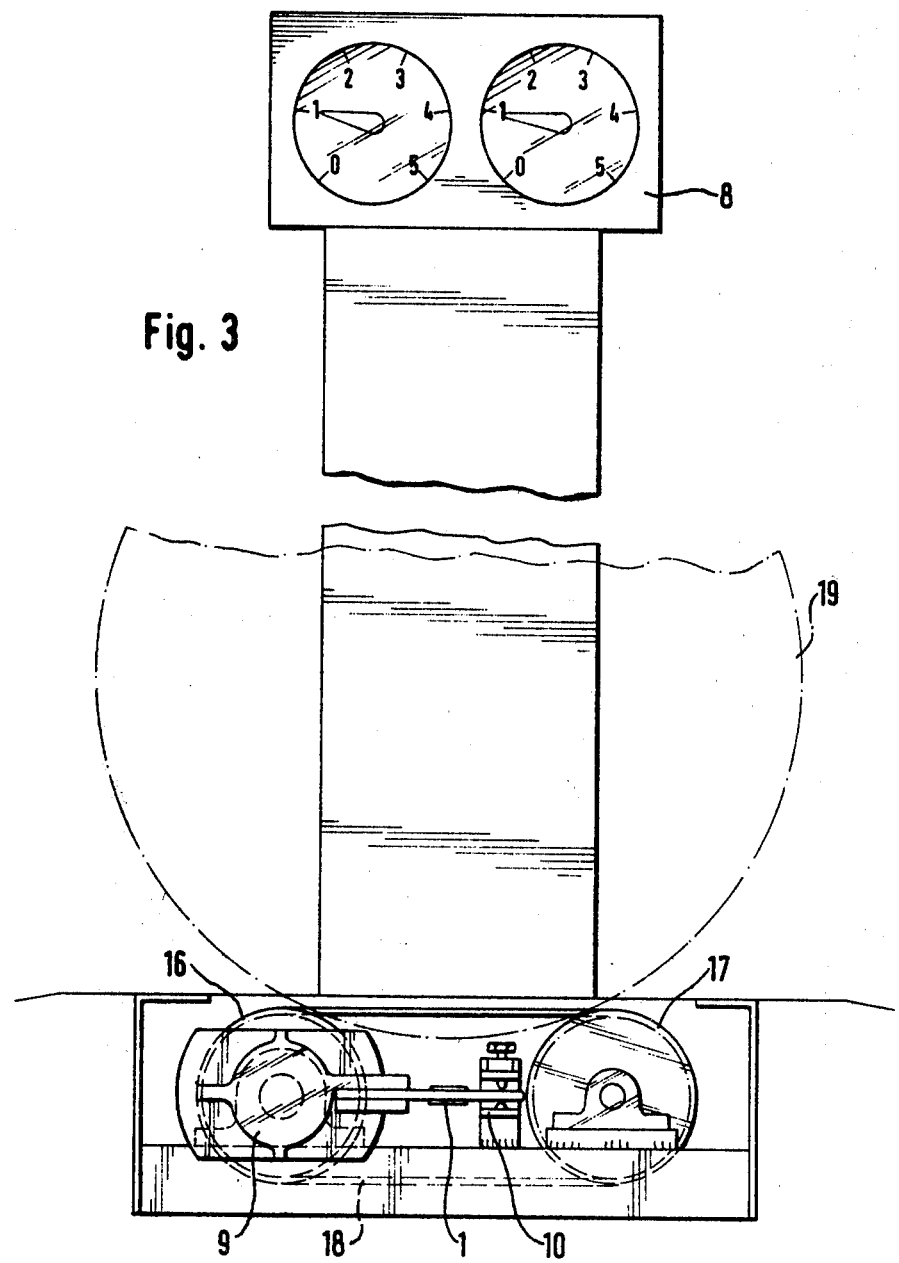
FIG. 3 is a side view on line III—III of FIGS. 1 and 2.

FIGS. 1 to 4 illustrate the mechanical structure of the inventive brake testing stand. Friction rollers 16 and 17 are drivingly connected with each other by means of a chain or a belt 18, so that they are simultaneously rotated and in use, support a wheel 19 indicated by the broken line in FIG. 3. The roller 16 is driven by a motor 20, the stator 9 of which motor is provided with a bearing 21 supporting the drive shaft of the motor, so that a restoring moment which develops during the driving of the rollers 16 and 17, especially during the application of the brakes on the wheel 19, leads to a torsional movement of the stator 9.

The motor 20 and rollers 16 and 17, are mounted in a frame 2, also provided with a further, similarly structured arrangement, consisting of rollers 22 and 23 and motor 24 and associated devices, which serve for the testing of the brakes of the other wheel.

As seen in FIG. 4, a fish plate 25 is attached to the stator 9, and a leaf spring 1 is fastened to the fish plate 25 by means of a plate 26 and screws 27 and 28. The drive shaft of the motor 20 is indicated by numeral 29. The connection of the drive shaft 29 with the friction roller 16 is not illustrated in detail, the motor 20 being of a type known in the prior art.

The free end of spring 1, depending on the rotational direction, engages a support point which is formed at the center line 10 of a set screw 13 and a block 14. The set screw and block terminate in rounded conical ends 11 and 12.

The spring 1 carries on its opposite surfaces resilient strain gauges 3 and 4, and 5 and 6. FIG. 5 shows a portion of the spring 1 with the arrangement of the resilient strain gauges. A resilient strain gauge, as known in the prior art and as shown in FIG. 6, consists substantially of a multi-loop resistance wire 31 mounted on a support 30, and when the latter is adhered to the spring 1 it will be deformed during deformation of the spring. The bending stress leads either to a lengthening of the resistance wire and accordingly to a reduction of its cross-section and an increase in the resistance of the wire or, alternatively, to an increase in the cross-section of the wire and a corresponding decrease in its resistance.

The restoring moment, which is transmitted into the spring 1 by a stator 9, will result in a bending of the spring 1 and by means of the broken lines 32 and 33, the deformation of the upper or lower surface of the spring 1 is indicated in an exaggerated manner.

Figure 7:
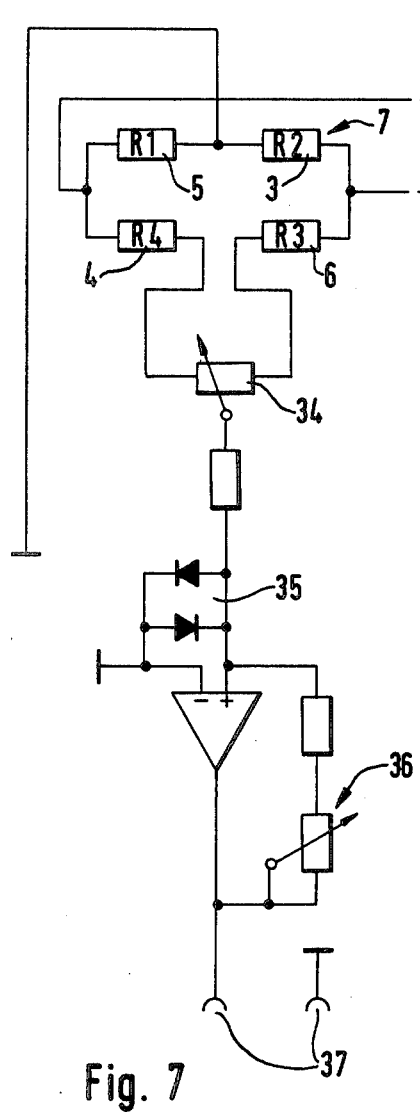
FIG. 7 is a circuit diagram of a Wheatstone Bridge and associated measured value amplifier.

The strain gauges 3, 4, 5, and 6 correspond with the resistances R1, R2, R3 and R4 in the circuit diagram of FIG. 7, the strain gauges being connected to form a Wheatstone bridge 7. With this arrangement, alterations in the lengths of the strain gauges due to temperature changes are compensated and the bridge stress at the zero torque can be adjusted to zero by the adjusting resistance 34. A diode switch 35 is provided as a protective switch means against undesired overflows and by means of an amplifying arrangement 36 at the output 37 of the circuit according to FIG. 7 there exists a measured voltage of up to +−10 volts. The initial voltage 38 in general is 24 volts.

Figure 8:
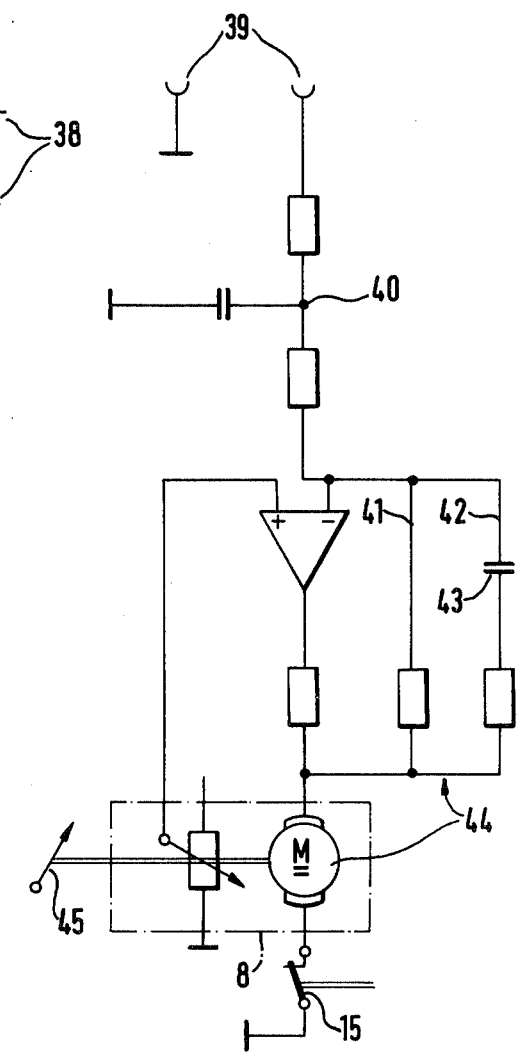
FIG. 8 is a circuit diagram of the electrical structure of a follow-up energizer for a measuring device.

The output 37 of the circuit diagram according to FIG. 7 corresponds with the input 39 of the circuit diagram according to FIG. 8 of the follow-up energizer with a motor potentiometer. This follow-up energizer is in practice a variable gain amplifier. By means of return loops 41 and 42 it is possible to change this action. The resistance determines the size of the proportional portion. During the development of a normal difference, namely a difference between the actual torque value and the indicated value, there develops a controlled output which is proportional to the normal difference. The return movement capacitor 43 determines an integral component. As a result, a normal difference has thus a constantly-increasing control output, which increases or decreases the faster or the larger is the normal difference. The now existing controlled output is added from the proportional component and the integral component. A motor potentiometer is indicated by numeral 44. As long as the motor potentiometer stands at zero, a zero voltage is produced at the slide of the potentiometer. This means that a stress difference develops at the input of the follow-up energizer. This is increased, depending on the size of the resistance, and is transmitted to the motor of the potentiometer. The motor now moves the potentiometer and thereby also the indicator of the indicating element 45, which may be a component part of the indicator instrument 8 (FIG. 3), until that stress is tapped from the slide which is indicated by the test result amplifier (FIG. 7). The measured value voltage and the potentiometer voltage are then equal. The normal difference becomes zero and the motor stops in the obtained position.

Figure 9:
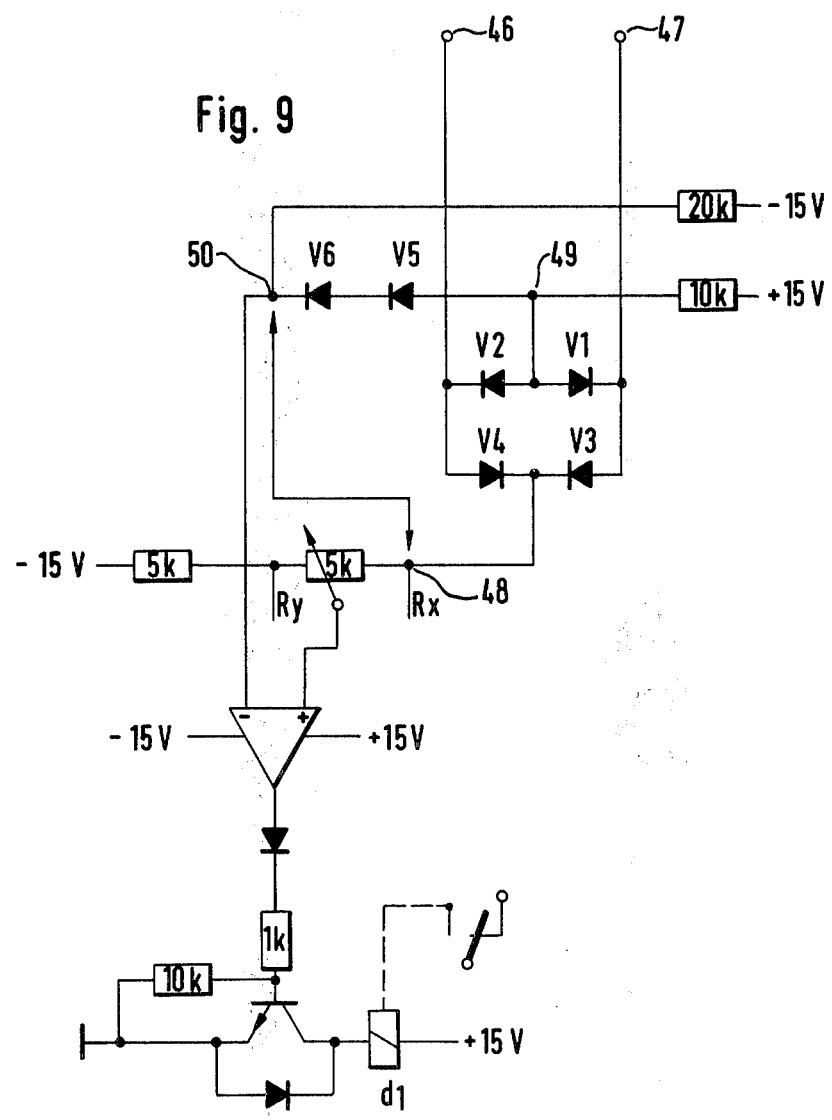
FIG. 9 is a circuit diagram of the electrical structure of a detail of the instant invention.

The circuit diagram of FIG. 9 serves to release a signal when the difference of the measured values of both wheels of an axle exceeds a predetermined adjustable portion of the maximum indicated measured values. The measured stresses obtained from the left and right wheel are fed in at 46 and 47. These measured values are converted by diode switches V 1, V 2, V 3, and V 4 in such a manner that at the exit of said diode switches, the difference between the two measured stresses will always have the same polarity. For example, it may be assumed that the measured value of the right wheel is 5 volts and in contrast the measured value of the left wheel is 3 volts. The diode V 4 is adjustable and the measuring point 48 has a potential of 5 volts minus 0.7 volts (diffusion stress of the diode) equalling 4.3 volts. This blocks the diode V 3.

The diode V 1 retains the measuring point 49 to 3 volts plus 0.7 volts, namely, 3.7 volts. This will result in a difference between the measuring points 48 and 49 of 0.6 volts.

The diodes V 5 and V 6 balance the voltage drops of the diode circuits V1, V2, V3 and V4. Their diffusion voltages are eliminated so that the stress between the measuring point 48 and the measuring point 50 corresponds with the difference between the two measured values, namely, in the above given example of a difference of 2 volts with the identical polarity.

The value of the desired switch difference can then be adjusted on the voltage distributor Rx-Ry. If the voltage distributor relationship, for example, is selected as 9/10, then the feed shaft rests at 90% of a higher indicator value. If this value is exceeded, a signal is then released.

Whilst a preferred embodiment of the invention has been described in detail, it will be appreciated to those skilled in the art, that various modifications can be made within the scope of the invention as defined in the appended claims.

What is claimed is:

1. Motor vehicle brake testing apparatus comprising a frame, a pair of rollers mounted on said frame for supporting a wheel having a brake to be tested, a drive motor for rotating said rollers, said motor having a stator and a rotor, said stator being mounted for rotational movement relative to said frame under the influence of reverse torque induced in said stator on the application of a brake being tested, a torque arm in the form of an elongated spring having one end attached to said stator, said spring extending outwardly from said stator and terminating in a free outer end, an abutment member on said frame for reacting against a surface of said spring adjacent said free outer end on the application of reverse torque to said stator thereby establishing a stress in said spring, strain gauge means associated with said spring for sensing the stress, and indicator means associated with said strain gauge means for measuring the stress.

2. The apparatus of claim 1 wherein said strain gauge means comprises a pair of strain gauges on one surface of said spring and a further pair of strain gauges on the opposite surface of said spring, said strain gauges being arranged in a Wheatstone bridge formation and said indicator means including electric circuit means for measuring an imbalance in said bridge formation.

3. The apparatus of claim 2 wherein said circuit means includes means for amplifying a voltage differential output from said bridge and means for rectifying said output.

4. The apparatus of claim 2 wherein said circuit includes an indicating instrument having a center-zero position.

5. The apparatus of claim 2 wherein said circuit includes an indicating instrument having a test value storing means.

6. The apparatus of claim 1 including a further pair of rollers for supporting a second wheel with a brake to be tested, a further drive motor for rotating said further pair of rollers and having a stator and a rotor, a further spring having one end attached to the stator of said further motor and a further abutment member on said frame for engaging said further spring on the application of reverse torque to said further motor, further strain gauge means associated with said further spring, further indicator means associated with said further strain gauge means, and means coupled with the respective indicator means comparing the respective outputs thereof and producing a signal when the respective outputs vary by a predetermined amount.

7. The apparatus of claim 6 wherein said coupling means includes a storage device for storing a preset stress differential.

8. The apparatus of claim 1 wherein said indicator means includes means for recording a preset stress value, means for comparing said preset value with the measured stress value and means for issuing a signal when preset value and said measured value differ by a predetermined amount.

9. The apparatus of claim 1 wherein said indicator means includes a storage device for predetermined stress value.

10. Motor vehicle brake testing apparatus comprising a frame, a pair of rollers mounted on said frame for supporting a wheel having a brake to be tested, a drive motor for rotating said rollers, said motor having a stator and a rotor, said stator being mounted for rotational movement relative to said frame under the influence of reverse torque induced in said stator on the application of a brake being tested, a leaf spring forming a torque arm mounted between said stator and spring-constraining means on said frame whereby reverse torque induced in said stator establishes a stress in said leaf spring, strain gauge means associated with said leaf spring for sensing the stress, and indicator means associated with said strain gauge means for measuring the stress, wherein said spring is attached at one end of said stator and said constraining means comprises opposed members for engaging opposite surfaces of said spring at its other end.

11. The apparatus of claim 10 wherein said opposed members are substantially conical and have rounded ends for contacting the opposite surfaces of said spring respectively.

12. The apparatus of claim 10 wherein at least one of said opposed members has an adjustable point of application.

* * * * *